Nov. 7, 1950  R. D. TOUTON  2,528,982
DEVICE FOR CONTROLLING AIR CONDITION
Filed June 5, 1946

INVENTOR.
Rush D. Touton
BY
ATTORNEYS

Patented Nov. 7, 1950

2,528,982

UNITED STATES PATENT OFFICE 2,528,982

DEVICE FOR CONTROLLING AIR CONDITION

Rush D. Touton, Wynnewood, Pa., assignor to Wurton Machine Company, Philadelphia, Pa., a corporation of Pennsylvania Application June 5, 1946, Serial No. 674,525

5 Claims. (Cl. 236—44)

This invention relates to a device for controlling air condition, as, for example, the relative humidity of air in a chamber wherein it is desired to maintain a constant high relative humidity for the processing of material.

The device in accordance with this invention has the merit of great accuracy of control and, at the same time, is inexpensive. The device is adapted for the control of high relative humidity, or supersaturation of air, for any purpose, but will be found especially adaptable for the maintenance of high relative humidity for the moistening of tobacco.

Generally, according to this invention, a control device is provided for the maintenance of high relative humidity through the medium of a hygrostat, as a membrane type hygrostat which, quite simple and inexpensive, would ordinarily be inoperative for the purpose where a high relative humidity is to be maintained, or a wet and dry bulb type which would not be operative where supersaturation is to be maintained.

Having now indicated in a general way the nature and purpose of this invention, I will proceed to describe a preferred embodiment with reference to the accompanying drawing, in which.

Figure 1:
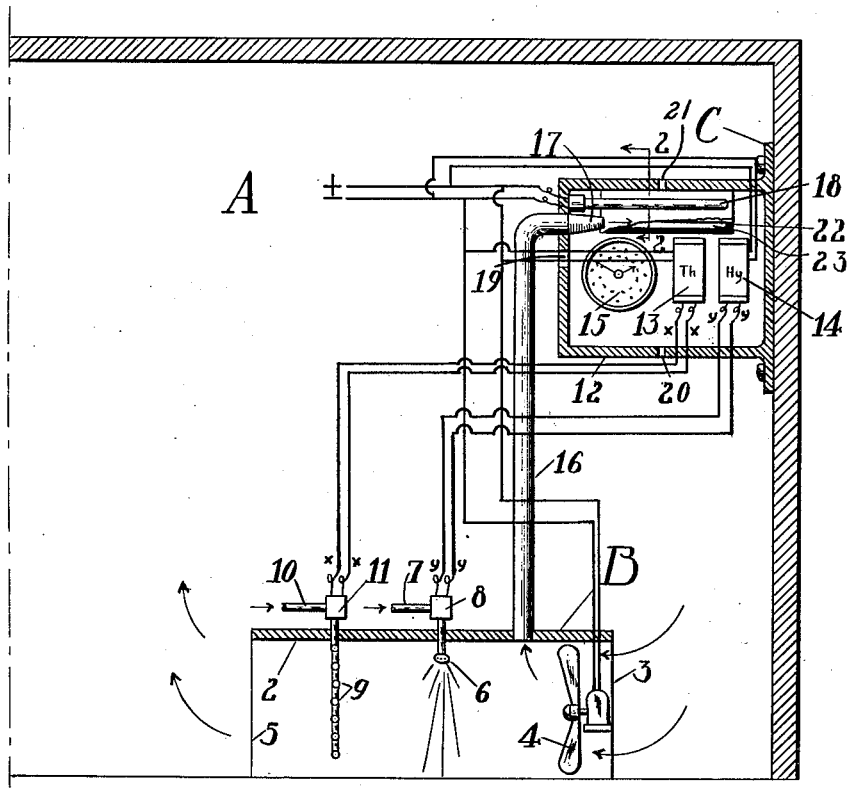
Figure 1 is a cross-sectional view, partly broken away, illustrating a heating chamber, means for the conditioning and circulation of conditioned air therein and a device according to this invention for the control of the condition of the air.
Figure 2:
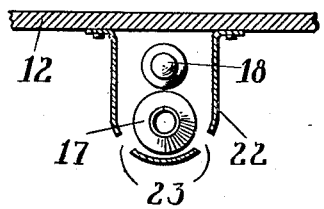
Figure 2 is a sectional view on line 2—2, Figure 1.

In the drawing, A indicates a chamber while B indicates an air conditioning apparatus adapted for the conditioning and circulation of conditioned air within the chamber. The walls of the chamber will desirably be insulated or coated with, for example, aluminum to prevent loss of heat from the chamber. The air conditioning apparatus may be within the chamber, as shown, or without the chamber and connected to the interior thereof by ducts.

The chamber A may be adapted for the reception of any material for processing with conditioned air where a high relative humidity or supersaturation is required. However, by way of example, the chamber A may contain a form of apparatus for conditioning tobacco, such as is disclosed by U. S. Patent No. 2,151,947, dated March 28, 1939, to Rush D. Touton, and in connection with which heated air at a high relative humidity of the order of 95% is required.

The air conditioning and circulating apparatus B may be of any desired form. However, as shown, it may consist of a casing 2 having an inlet 3 at which is a motor driven fan 4 and an outlet 5. Within the casing is a spray nozzle 6 supplied with water from any suitable source through a pipe 7 under control of an electrically operated valve 8. Also, within the casing is a heating coil 9 supplied with steam, or other heating fluid, through a pipe 10 under control of an electrically operated valve 11.

As will be apparent, the fan 4 draws air from the chamber A and passes it through the casing 2 back into the chamber, thus effecting a circulation of air in the chamber through the casing. Moisture is supplied to the air and the air is heated by the spray 6 and coils 9 under control of the valves 8 and 11.

The valves 8 and 11 are controlled by the device C of this invention, which sensitive, as will appear, to the temperature and relative humidity of the air in the chamber A, acts to control heat and/or moisture of the air passing through the chamber as may be necessary to maintain a constant desired condition of temperature and relative humidity or supersaturation in the chamber.

The device comprises a casing 12, which may be insulated, mounted within the chamber adjacent to the conditioning apparatus B, though it may as well be mounted without the chamber.

Within the casing 12 is mounted a thermostat 13, of any desired well known type, adapted to make and break a circuit, indicated by the wires X, including the electrically operated valve 11 which controls the admission of heating fluid to coil 9. Also mounted within the casing 12 is a control 14 sensitive to relative humidity, as, for example, a membrane type hygrostat, utilizing hair, wood, silk, animal membrane, gut, or the like, or a wet and dry bulb type, or the like, to make and break a circuit, indicated by the wires Y, including the electrically operated valve 8, which controls the admission of water to spray 6; and desirably a temperature and humidity recorder 15 comprising a thermometer and a hygrometer, is mounted within the casing 12.

The casing 12 is connected to receive a sample of air from chamber A as delivered into the casing 2 by fan 4 through a conduit 16, which extends through the front wall of the casing 12 and terminates within the upper portion of the casing in a nozzle 17 directed in substantial parallelism with an elongated heating element, as an electric lamp 18, positioned above the nozzle. Beneath the lamp 18 is a shield 22 having slots 23 for the passage of light for illumination of the instruments, above which the air from nozzle 17 is delivered and which acts to prevent radiant heat from lamp 18 from affecting the instruments. Below and adjacent to the nozzle 17 is an outlet opening 19 in the front wall of the casing; and an inlet opening 20 and an outlet opening 21 are provided in the bottom and top of the casing.

It will now be observed that with the fan 4 in operation air from the chamber A will be delivered through conduit 16 into casing 12, and circulated therein by the direction of the nozzle 17, which will have an induction effect to blend air from the chamber with the incoming air as well as a directional effect to cause the blended air to sweep over the lamp 18 and then pass down over the thermostat and hygrostat. Air will escape from casing 12 through the opening 19.

The pipe 16 will be of such size with respect to the capacity of casing 12 and the delivery of fan 4 and with respect to the heat output of lamp 18 as to obtain a substantially uniform condition in the casing and a desired rate of response and magnitude, rapid or slow in the control elements.

When a condition of high relative humidity, say of the order of 95% at a dry bulb temperature say of the order of 75° F. is to be maintained in chamber A for the moistening, for example, of tobacco, the hygrostat 14, being the membrane type, would ordinarily be inoperable for the proper control of spray valve 8 for the maintenance of the high humidity, since the membrane would become moisture logged at the high humidity and cease to function. Generally speaking, a membrane type hygrostat will not function when the relative humidity is above about 80% and is most efficient at around 50% to 75% relative humidity.

Therefore, in operation of the device the lamp 18 is lighted and serves to supply heat to the air entering the casing through nozzle 17 to increase its temperature to a point such that the relative humidity is lowered to a point such that the membrane of the hygrostat will function effectively without becoming moisture logged. Overheating of the interior of casing 12, as in the event that the fan 4 ceases to operate, is prevented by the provision of the openings 20 and 21; and desirably the lamp 18 will be in circuit with the fan so that it will go out when the fan is stopped.

By way of example, where it is desired to maintain in the chamber A a dry bulb temperature of 75° F. and a relative humidity of 95%, the lamp will be such, with respect to the amount of air delivered into the casing, as to effect a rise of about 9° F., or more, in the temperature of the air in the casing 12 with consequent decrease in the relative humidity of the air in the casing to about 70%, or below, at which the membrane hygrostat 14 will function efficiently.

Similarly, by the provision of a lamp to give sufficient heat, conditions of supersaturation may be maintained in the chamber A, with use of a membrane type hygrostat or a wet and dry bulb control.

It will be appreciated that the apparatus of this invention is adaptable for use however high relative humidity is desired in chamber A, or even with supersaturated air, it being only necessary to provide a lamp with sufficient heat output with relation to the air flow in the casing to bring about a condition in casing 12 at which the hygrostat will be efficient.

The thermostat 13 and the hygrostat 14 will, of course, be adjusted with respect to the relative temperature and relative humidity in the casing 12, so as to maintain the desired condition of temperature, relative humidity or supersaturation in chamber A by operation of the valves 8 and 11, respectively controlling the supply of moisture and heat to the air. Likewise, the recorder 15 will be set back so as to record the actual condition of the air entering the casing 2 of the conditioning apparatus, i. e., as delivered into the casing 2 by the fan 4, as compared with the condition obtaining in casing 12.

It will be understood that the invention above described may be utilized for controlling the relative humidity of any air condition. Thus, the coil 9 and the spray 6 may be supplied with either a hot or a cold medium depending upon the temperature condition desired in chamber A.

What I claim and desire to protect by Letters Patent is:

1. A device for controlling air condition comprising a casing, a nozzle extending horizontally within the upper portion of said casing for the direction thereinto of a sample of air the condition of which is to be controlled, an outlet for air from the casing below and adjacent to said nozzle, an elongated heating element within said casing positioned above and extending in parallelism with a line projected on the axis of said nozzle, and a membrane hygrostat positioned within said casing at a point below and relatively remote from the discharge end of said nozzle and from said heating element.

2. A device for controlling air condition comprising a casing, a nozzle extending horizontally within the upper portion of said casing for the direction thereinto of a sample of air the condition of which is to be controlled, an outlet for air from the casing below and adjacent to said nozzle, an elongated heating element within said casing positioned above and extending in parallelism with a line projected on the axis of said nozzle, a shield extending beneath said heating element from below and adjacent the end of said nozzle, and a membrane hygrostat positioned within said casing at a point below and relatively remote from the discharge end of said nozzle and from said heating element.

3. A device for controlling air condition comprising a casing, a nozzle extending horizontally within the upper portion of said casing for the direction thereinto of a sample of air the condition of which is to be controlled, an outlet for air from the casing below and adjacent to said nozzle, an elongated heating element within said casing positioned above and extending in parallelism with said nozzle, a membrane hygrostat positioned within said casing at a point below and relatively remote from the discharge end of said nozzle and from said heating element and an opening in the top and in the bottom of said casing.

4. A device for controlling air condition in a chamber comprising means for the circulation of air in the chamber, means for the supply of moisture to air in the chamber, means for sampling air in the chamber, a control sensitive to relative humidity exposed to the sampled air for control of the means for the supply of moisture to air in the chamber means for heating the sampled air to lower its relative humidity to within the effective operating range of the control sensitive to relative humidity before it reaches said control and a second control sensitive to temperature for the control of the supply of heat to the air the condition of which is to be controlled positioned within the casing.

5. A device for controlling air condition comprising a casing, means for the direction of a sample of air the condition of which is to be controlled into the casing, an opening in the casing for the outlet of air therefrom, a control sensitive to relative humidity for the control of the admission of moisture to the air the condition of which is to be controlled positioned within the casing, means within the casing for raising the temperature of entering air to lower its relative humidity to within the effective operating range of said control sensitive to relative humidity before it reaches said control and a second control sensitive to temperature for the control of the supply of heat to the air the condition of which is to be controlled positioned within the casing.

RUSH D. TOUTON.

REFERENCES CITED

The following references are of record in the file of this patent:

UNITED STATES PATENTS

| Number | Name | Date |
|---|---|---|
| 1,167,740 | Carrier | Jan. 11, 1916 |
| 1,776,014 | Vance | Sept. 16, 1930 |